US010405286B2

(12) United States Patent
Shim et al.

(10) Patent No.: US 10,405,286 B2
(45) Date of Patent: Sep. 3, 2019

(54) APPARATUS AND METHOD FOR SYNCHRONIZATION SIGNAL DETECTION

(71) Applicant: Samsung Electronics Co., Ltd., Suwon-si, Gyeonggi-do (KR)

(72) Inventors: Seijoon Shim, Suwon-si (KR); Youngtaek Bae, Suwon-si (KR); Hayoung Yang, Yongin-si (KR); Joohyun Lee, Suwon-si (KR); Soong-Yoon Choi, Suwon-si (KR); Chanho Choi, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 355 days.

(21) Appl. No.: 15/149,725

(22) Filed: May 9, 2016

(65) Prior Publication Data

US 2016/0330703 A1 Nov. 10, 2016

(30) Foreign Application Priority Data

May 8, 2015 (KR) ........................ 10-2015-0064565

(51) Int. Cl.
*H04W 56/00* (2009.01)
*H04L 5/14* (2006.01)
*H04W 92/20* (2009.01)
*H04L 5/00* (2006.01)

(52) U.S. Cl.
CPC ......... *H04W 56/001* (2013.01); *H04L 5/0053* (2013.01); *H04W 92/20* (2013.01)

(58) Field of Classification Search
CPC ........ H04W 56/001; H04W 92/20; H04L 5/14
See application file for complete search history.

(56) References Cited

U.S. PATENT DOCUMENTS 5,727,034 A 3/1998 Ojaniemi
6,061,822 A 5/2000 Meyer
6,581,164 B1 6/2003 Felts, III et al.
6,947,402 B2 9/2005 Sezgin et al.
7,110,376 B2 9/2006 Lindoff et al.
7,463,618 B2 12/2008 Litwin et al.
(Continued)

FOREIGN PATENT DOCUMENTS

WO 2011022404 A2 2/2011
WO 2014092366 A1 6/2014
WO 2014135204 A1 9/2014

OTHER PUBLICATIONS

US 8,532,027 B2, 09/2013, Zha et al. (withdrawn)
(Continued)

*Primary Examiner* — Ivan O Latorre
*Assistant Examiner* — Nourali Mansoury
(74) *Attorney, Agent, or Firm* — Jefferson IP Law, LLP

(57) ABSTRACT

A method of an electronic device is provided. The method includes receiving signals from adjacent base stations comprising a first base station and a second base station, respectively, detecting a first synchronization signal and a second synchronization signal for the first base station among the received signals, estimating a first signal corresponding to the detected first synchronization signal and second synchronization signal, eliminating the first signal among the signals received from the adjacent base stations, and detecting a second signal for the second base station.

16 Claims, 10 Drawing Sheets

(56) References Cited

U.S. PATENT DOCUMENTS 7,808,967 B2 10/2010 Han et al.
7,848,194 B2 12/2010 Yamawaki
7,881,343 B2 2/2011 Bichot et al.
7,907,592 B2 3/2011 Han et al.
7,916,714 B2 3/2011 Han et al.
7,924,808 B2 4/2011 Han et al.
8,009,661 B2 8/2011 Lindoff et al.
8,014,311 B2 * 9/2011 Lindoff ................ H04B 17/318 370/252
8,050,225 B2 11/2011 Luo
8,054,823 B2 11/2011 Dabak et al.
8,098,647 B2 1/2012 Han et al.
8,155,106 B2 4/2012 Han et al.
8,174,958 B2 5/2012 Kent
8,175,077 B2 5/2012 Dabak et al.
8,189,557 B2 5/2012 Onggosanusi et al.
8,223,891 B2 7/2012 Kent
8,249,632 B2 8/2012 Kim et al.
8,289,946 B2 10/2012 Luo et al.
8,311,031 B2 11/2012 Kim et al.
8,320,565 B2 11/2012 Chang et al.
8,320,571 B2 11/2012 Chang et al.
8,320,907 B2 11/2012 Han et al.
8,331,331 B2 12/2012 Luo
8,331,564 B2 12/2012 Chang et al.
8,379,542 B2 2/2013 Wang et al.
8,385,222 B2 2/2013 Lindoff et al.
8,385,276 B2 2/2013 Kim et al.
8,395,985 B2 3/2013 Dinan
8,406,218 B2 3/2013 Kim et al.
8,417,252 B2 4/2013 Palanki et al.
8,428,016 B2 4/2013 Bhattad et al.
8,437,308 B2 5/2013 Lindoff
8,447,005 B2 5/2013 Axmon et al.
8,451,740 B2 5/2013 Sampath et al.
8,493,964 B2 7/2013 Han et al.
8,498,197 B2 7/2013 Kent
8,509,110 B2 8/2013 Kim et al.
8,515,472 B2 8/2013 Han et al.
8,526,347 B2 9/2013 Wang et al.
8,542,783 B2 9/2013 Zhou et al.
8,543,151 B2 9/2013 Kim et al.
8,547,821 B2 10/2013 Lindoff et al.
8,559,296 B2 10/2013 Kent
8,565,807 B2 10/2013 Michel et al.
8,576,810 B2 11/2013 Yi
8,576,869 B2 11/2013 Wilhelmsson et al.
8,583,155 B2 11/2013 Swarts et al.
8,588,136 B2 11/2013 Zha et al.
8,599,828 B2 12/2013 Fine et al.
8,614,994 B2 12/2013 Swarts et al.
8,619,936 B2 12/2013 Mirek et al.
8,649,401 B2 2/2014 Luo et al.
8,665,799 B2 3/2014 Malladi et al.
8,665,809 B2 3/2014 Malladi et al.
8,670,734 B2 3/2014 Srinivasan et al.
8,675,554 B2 3/2014 Baglin et al.
8,681,730 B2 3/2014 Swarts et al.
8,705,399 B2 4/2014 Lo et al.
8,718,154 B2 5/2014 Yoo et al.
8,718,641 B2 5/2014 Baek et al.
8,724,498 B2 5/2014 Choi et al.
8,730,938 B2 5/2014 Gheorghiu et al.
8,731,573 B2 5/2014 Lindoff et al.
8,737,276 B2 5/2014 Madan et al.
8,743,813 B2 6/2014 Liu et al.
8,768,359 B2 7/2014 Luo et al.
8,774,230 B2 7/2014 Gheorghiu et al.
8,780,790 B2 7/2014 Sarkar
8,798,208 B2 8/2014 Shin et al.
8,798,213 B2 8/2014 Lindoff et al.
8,804,478 B2 8/2014 Han et al.
8,811,319 B2 8/2014 Shen
8,817,736 B2 8/2014 Dinan
8,817,771 B1 8/2014 Zhao et al.
8,824,269 B2 9/2014 Kent
8,824,533 B2 9/2014 Chmiel et al.
8,830,983 B2 9/2014 Han et al.
8,830,984 B2 9/2014 Dabak et al.
2005/0100109 A1 * 5/2005 Nagata .................... H04L 5/026 375/260
2008/0198068 A1 * 8/2008 Kurata .................. G01S 19/252 342/357.29
2009/0279419 A1 * 11/2009 To ......................... H04L 1/0026 370/208
2011/0170527 A1 * 7/2011 Yamamoto .......... H04L 27/2655 370/338
2011/0195684 A1 * 8/2011 Zhang ................. H04B 1/7107 455/226.1
2011/0274097 A1 11/2011 Zhang et al.
2013/0301451 A1 * 11/2013 Siomina ................ H04W 24/00 370/252
2014/0161044 A1 6/2014 Luo et al.
2014/0254564 A1 9/2014 Khude et al.
2014/0307830 A1 * 10/2014 Hahm ................. H04L 27/2662 375/296
2015/0109974 A1 4/2015 Zeng et al.
2015/0163707 A1 * 6/2015 Hwang ............. H04W 36/0061 370/331
2015/0280887 A1 10/2015 Ko et al.

OTHER PUBLICATIONS

Manolakis et al.; A Closed Concept for Synchronization and Cell Search in 3GPP LTE Systems; IEEE Communications Society; Jun. 2009.

Xu et al.; Robust Synchronization for 3GPP LTE System; IEEE Communications Society; Mar. 2010.

Tsai et al.; A New Timing Synchronization and Cell Search Procedure Resistant to Carrier Frequency Offsets for 3GPP-LTE Downlink; IEEE International Conference on Communications; Sep. 2012; CN.

Yu et al.; A Novel Time and Frequency Synchronization for 3GPP LTE Cell Search; 2012 8th International Conference on Wireless Communications, Networking and Mobile Computing (WiCOM); Sep. 2012.

European Office Action dated Jun. 4, 2019; Application #: 16 792 934.8-1219; Ref.: P6071872PCT/EP.

* cited by examiner

APPARATUS AND METHOD FOR SYNCHRONIZATION SIGNAL DETECTION

CROSS-REFERENCE TO RELATED APPLICATION(S)

This application claims the benefit under 35 U.S.C. § 119(a) of a Korean patent application filed on May 8, 2015 in the Korean Intellectual Property Office and assigned Serial number 10-2015-0064565, the entire disclosure of which is hereby incorporated by reference.

TECHNICAL FIELD

The present disclosure relates to synchronization signal detection control in a communication system.

BACKGROUND

Recently, the release 13 standard is trying to reflect a licensed assisted access (LAA, commonly called LTE-U) which is a service making use of an unlicensed band (e.g., 5 Giga Hertz (GHz)) in long term evolution (LTE). Also, LTE release 12 is already supporting discovery reference signal (D-RS) or radio interface-based synchronization (RIBS), etc. Accordingly, synchronization in not only an existing terminal but also a small cell base station, etc. has become a very important function.

A synchronization process is a process in which, when a terminal or small cell base station powers on, the terminal or small cell base station finds a symbol boundary, a frame boundary with an adjacent base station in order to provide a data service. By finding the symbol boundary, frame boundary, the terminal or small cell base station can get cell IDentification (CID) information of each base station in a situation in which several base stations exist.

In a case where several cell identifications exist and a symbol and frame synchronization by each cell identification is different, a synchronization system searches the symbol and frame synchronization by cell identification, and detects a cell identification in a synchronization and non-synchronization cell identification detection method. In this case, when searching a frame synchronization by cell identification, the synchronization system can be influenced by a cell identification having strong transmission power. The cell identification having the strong transmission power can lead to an increase of a search failure signal, deteriorating the symbol and frame synchronization and the performance of cell identification detection. Particularly, there is a difference of a time point of reception of a base station synchronization signal and thus, the more the power of an interference signal escaping a cyclic prefix (CP), accurate symbol synchronization estimation is not achieved, so performance deterioration can take place.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for eliminating performance deterioration that can take place in a synchronization process in a communication system.

Another aspect of the present disclosure is to provide an apparatus and method for controlling synchronization signal detection in a communication system.

In accordance with an aspect of the present disclosure, a method of an electronic device is provided. The method includes receiving signals from adjacent base stations comprising a first base station and a second base station, respectively, detecting a first synchronization signal and a second synchronization signal for the first base station among the received signals, estimating a first signal corresponding to the first synchronization signal and the second synchronization signal, eliminating the first signal among the received signals, and detecting a second signal for the second base station having a different symbol boundary from the first base station.

In accordance with another aspect of the present disclosure, an electronic device is provided. The electronic device includes a reception unit configured to receive signals from adjacent base stations comprising a first base station and a second base station, respectively, and a controller configured to detect a first synchronization signal and a second synchronization signal for the first base station among the received signals, estimate a first signal corresponding to the first synchronization signal and the second synchronization signal, eliminate the first signal among the received signals, and detect a second signal for the second base station.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, a term denoting control information, a term denoting a multiple-antenna signal processing scheme, a term (e.g., a domain, detection, estimation) denoting a status change, a term denoting a transmission signal, terms denoting network entities, terms (e.g., a signal, a first signal, an estimation signal) denoting messages, and a term denoting a constituent element of an apparatus, etc. are exemplified for description convenience. Accordingly, the present disclosure is not limited to the terms described later, and may use other terms having equivalent technological meanings.

The present disclosure describes a technology for controlling synchronization signal detection in a communication system. For example, the present disclosure relates to a technology for, when several base stations have been installed, controlling synchronization signal detection in a condition having to detect a synchronization and cell identification by each base station.

Figure 1:
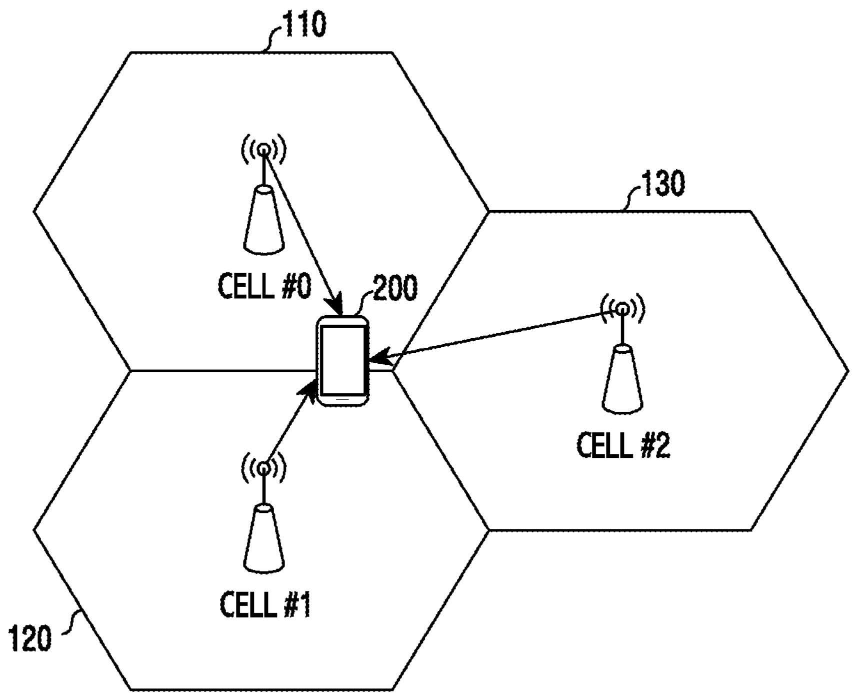
FIG. 1 illustrates an example of transmission of a base station synchronization signal in a wireless communication system to which various embodiments of the present disclosure are applied.

FIG. 1 illustrates an example of transmission of a base station synchronization signal in a wireless communication system to which various embodiments of the present disclosure are applied.

Referring to FIG. 1, an electronic device 200 may connect to base stations of adjacent cells 110, 120, and 130. In a case where the electronic device 200 powers on, before providing a data service, the electronic device 200 may search symbol boundaries and frame boundaries of the base stations of the adjacent cells 110, 120, and 130 and perform synchronization. That is, to acquire the synchronization of the adjacent cells 110, 120, and 130, the electronic device 200 may perform cell search, and detect cell identifications of the adjacent cells 110, 120, and 130. For explanation of the present disclosure, the following description assumes that a strength of a signal received from cell 120 (cell #1) is the greatest, and a strength of signal received from cell 110 (cell #0) is greater than a strength of signal received from cell 130 (cell #2). In other words, an order for the strengths of signals is the cell 120, the cell 110, and the cell 130.

In case of performing synchronization estimation for synchronization, a sum of signals that the electronic device 200 receives from the adjacent cells 110, 120, and 130 may be expressed as in Equation 1 below.

$$y_{PSS}(n)=h_0(n)\mathrm{PSS}_0(n)+h_1(n)\mathrm{PSS}_1(n+\tau_1)+h_2(n)\mathrm{PSS}_2(n+\tau_2)+w(n) \quad (1)$$

Equation 1

In Equation 1, $y_{PSS}$ denotes a signal summing up signals received from base stations, $h_i(n)$ denotes a reception path fading signal for a synchronization signal of an ith base station, $\mathrm{PSS}_i(n)$ denotes a primary synchronization signal (PSS) signal of an nth sample received from each ith base station, and w(n) denotes a white noise. Equation 1 may be an expression in a time domain. Here, a method of finding a boundary of a PSS symbol in a general synchronization process is to determine a correlation between the reception signal $y_{PSS}$ and the PSS signal and find a boundary of a symbol of a PSS that exceeds a constant threshold value. For example, a correlation value for $\mathrm{PSS}_0$ is given as $r_0$ and determined using Equation 2, given below.

Equation 2

$$r_0 = \frac{1}{N}\sum_{n=0}^{N-1} y_{PSS}(n)PSS_0^*(n) = h_0(n) + \alpha_1 h_1(n) + \alpha_2 h_2(n) + \tilde{w}(n) \ \ldots \ (2)$$

In Equation 2, $$\alpha_1 = \frac{1}{N}\sum_{n=0}^{N-1} PSS_1(n+\tau_1)PSS_0^*(n)$$

and $$\alpha_2 = \frac{1}{N}\sum_{n=0}^{N-1} PSS_2(n+\tau_2)PSS_0^*(n).$$

That is, Equation 2 shows a correlation value between respective base station synchronization signals (PSS) in consideration of a delay between reception paths. In this case, because a reception signal of the number 1 cell 120 of FIG. 1 has the greatest strength, $|h_0(n)|^2 >> |\alpha_1 h_1(n)|^2$ is not formed. In a case where $|h_0\ (n)|^2 \approx |\alpha_1 h_1(n)|^2$ or $|h_0(n)|^2 \geq |\alpha_1 h_1(n)|^2$ is given, the performance of symbol synchronization detection may be deteriorated due to the influence of interference of the reception signal which is received from the cell 120 (cell #1) in Equation 2. This deterioration of the performance of symbol synchronization detection may have influence even on a subsequent cell identification detection process, finally bringing about a deterioration of the performance of the entire synchronization block. Accordingly, an embodiment of the present disclosure performs synchronization detection control, thereby decreasing the influence of interference from a cell of a greatest signal strength.

Figure 2:
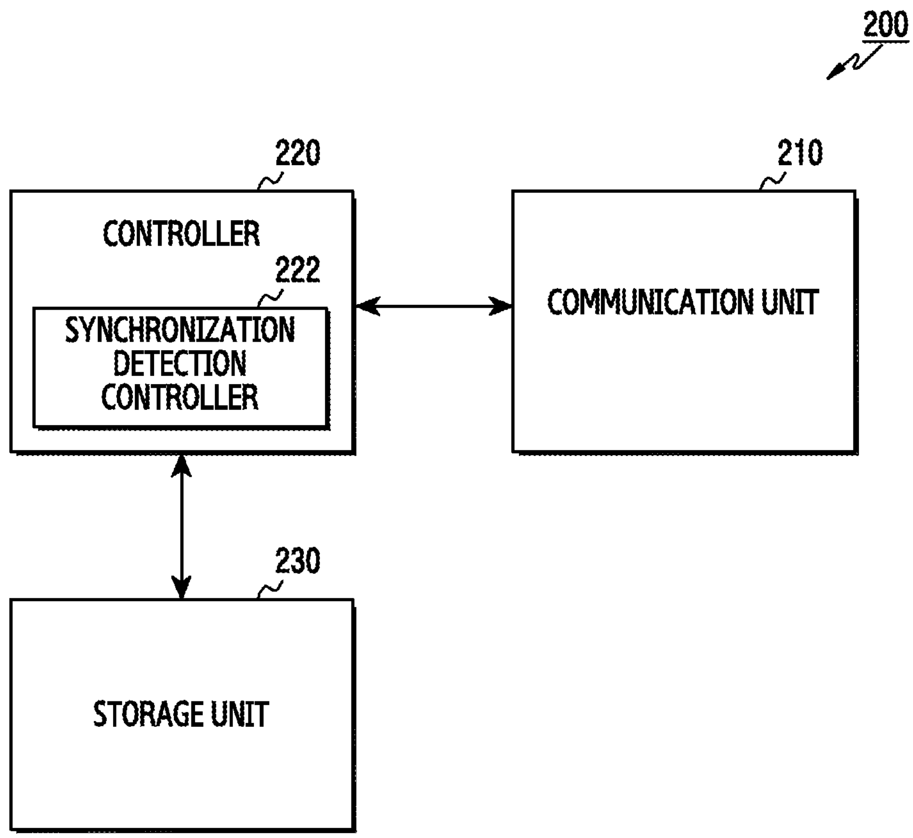
FIG. 2 is a block diagram of an apparatus for synchronization signal detection according to an embodiment of the present disclosure.

FIG. 2 is a block diagram of an apparatus for synchronization signal detection according to an embodiment of the present disclosure.

Referring to FIG. 2, the apparatus may be the electronic device 200. The electronic device 200 may include a communication unit 210, a controller 220, and a storage unit 230. In various embodiments, the electronic device may be a portable electronic device, and may be one of a smart phone, a user equipment (UE), a portable terminal, a mobile phone, a mobile pad, a media player, a tablet computer, a handheld computer or a personal digital assistant (PDA). Also, the electronic device may be a device combining two or more functions among the aforementioned devices. The terms ' . . . unit', ' . . . er', etc. used below represent the unit processing at least one function or operation. These terms may be implemented as hardware or software, or a combination of hardware and software.

The communication unit 210 performs a function for transmitting/receiving a signal. The communication unit 210 transmits/receives a signal provided from the controller and the storage unit 230. The communication unit 210 may perform a function for transmitting a signal or receiving a signal through a wireless channel. For example, the communication unit 210 may perform a function of conversion between a baseband signal and a bit stream in compliance with the physical layer standard of a system. For example, in case of transmitting data, the communication unit 210 may encode and modulate a transmission bit stream, thereby generating complex symbols. Also, in case of receiving data, the communication unit 210 may demodulate and decode a baseband signal, thereby restoring to a reception bit stream. The communication unit 210 may up convert a baseband signal into a radio frequency (RF) band signal and transmit through an antenna. The communication unit 210 may down convert an RF band signal received through the antenna, into a baseband signal. For example, the communication unit 210 may include a transmission filter, a reception filter, an amplifier, a mixer, an oscillator, a digital analog converter (DAC), an analog digital converter (ADC), etc. According to need, the communication unit 210 may be denoted as a transmission unit (end), a reception unit (end), or a transmission/reception unit (end).

The communication unit 210 may receive a signal from at least one base station. The signal may include a synchronization signal of each at least one base station. The synchronization signal may include at least one of a PSS and a secondary synchronization signal (SSS).

The storage unit 230 stores a basic program for an operation of the apparatus for controlling the synchronization signal detection, an application program, data of setting information, etc. For example, the storage unit 230 may store information related with a synchronization signal. The storage unit 230 may provide stored data in accordance with a request of the controller 220.

The controller 220 controls the general operations of the apparatus for controlling the synchronization signal detection. For example, the controller 220 controls the synchronization signal detection control apparatus to perform procedures illustrated in FIG. 6 to FIG. 10 below. The controller 220 may include a synchronization detection controller 222. To control a synchronization signal in the communication system, the controller 220 may execute the control of the synchronization signal through the synchronization detection controller 222. The operation of the synchronization detection controller 222 according to an embodiment of the present disclosure is described below.

The synchronization detection controller 222 detects a cell identification within a group from a PSS of a base station having a signal of the greatest strength among signals received from adjacent base stations. The synchronization detection controller 222 performs fast Fourier transform (FFT) for the signal. Accordingly, as the FFT is performed, the signal that is a time-domain signal is transformed into a frequency-domain signal. The synchronization detection controller 222 acquires information about an SSS of the base station of the signal of the greatest strength and then detects a cell group identification using the acquired SSS information. The synchronization detection controller 222 estimates a channel using the SSS. By using the estimated channel and the detected cell identification, the synchronization detection controller 222 estimates a first signal corresponding to the PSS and the SSS. The estimated first signal is used to detect a cell identification of another base station having the same symbol boundary. The synchronization detection controller 222 may determine whether to eliminate a synchronization signal of another cell. The synchronization detection controller 222 performs inverse fast Fourier transform (IFFT) for the estimated first signal and transforms the estimated first signal that is a frequency-domain signal into a time-domain signal. The synchronization detection controller 222 may eliminate the estimated first signal among signals received from adjacent base stations, thereby eliminating the PSS and the SSS. By eliminating the PSS and the SSS, the synchronization detection controller 222 may eliminate the first signal of the greatest strength among the received signals.

Figure 3:
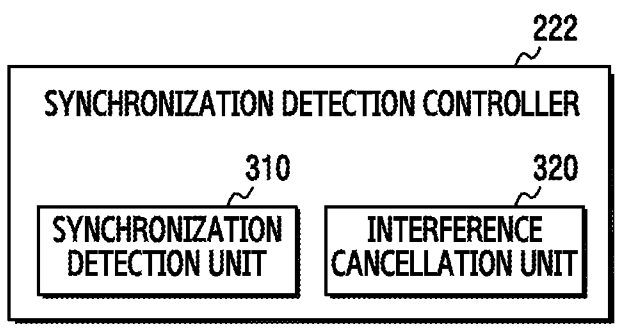
FIG. 3 is a block diagram of a synchronization detection controller according to an embodiment of the present disclosure.

FIG. 3 is a block diagram of a synchronization detection controller according to an embodiment of the present disclosure.

Referring to FIG. 3, the synchronization detection controller may be the synchronization detection controller 222 of FIG. 2. The synchronization detection controller 222 may eliminate a base station signal of the greatest signal strength among base station signals received from adjacent cells. The synchronization detection controller 222 may include a synchronization detection unit 310 and an interference cancellation unit 320.

The synchronization detection unit 310 may detect a symbol boundary and a PSS of a base station having a signal of the greatest signal strength. Through the detected PSS, the synchronization detection controller 222 may know a cell identification within one cell identification group and a position of an SSS. The synchronization detection unit 310 performs FFT for the signal of the greatest signal strength acquiring an identification number within the cell identification group. The FFT'd signal that is a time-domain signal is transformed into a frequency-domain signal. The synchronization detection unit 310 may acquire information about the SSS from the FFT'd signal and then detect the SSS. By detecting the SSS, the synchronization detection unit 310 may be aware of an identification of a cell group. The synchronization detection unit 310 may acquire the identification of the cell group and the identification number within the cell identification group from the PSS and the SSS, and detect the cell identification (referring to Equation 3 below). The synchronization detection controller 222 performs channel estimation using information acquired through the synchronization detection unit 310.

The interference cancellation unit 320 may estimate a signal corresponding to the PSS and the SSS using the estimated channel information and the cell identification information. The synchronization detection controller 222 performs IFFT for the estimated signal corresponding to the PSS and the SSS in a base station signal of a cell identification of the greatest signal strength. In a case where the synchronization detection controller 222 receives signals from adjacent cells having symbol boundaries different from the base station of the greatest signal strength, the synchronization detection controller 222 may eliminate the PSS and the SSS of the base station of the greatest signal strength from the received signals, thereby performing synchronization detection.

The present disclosure may be applied to a long term evolution (LTE) communication system. In the LTE standard, a structure of a synchronization signal may be varied according to a frequency division duplex (FDD) mode or a time division duplex (TDD) mode. The present disclosure describes the LTE system for example, but the present disclosure is not limited to the LTE system only. It may be recognized by those skilled in the art that the present disclosure may be applied to other communication systems as well as the LTE system.

The structure of the synchronization signal may be constructed as in FIG. 4 and FIG. 5 below. A PSS may be constructed using a Zadoff-Chu (ZC) sequence.

An SSS is comprised of a binary phase shift keying (BPSK) signal that is generated using a pseudo-random noise (PN) sequence. A total length of the PSS and the SSS is 62 symbols. Accordingly, the PSS and the SSS may be physically mapped to 62 subcarriers.

According to various embodiments, a method for operating an electronic device, the method comprises, receiving signals from adjacent base stations comprising a first base station and a second base station, respectively, detecting a first synchronization signal and a second synchronization signal for the first base station among the received signals, estimating a first signal corresponding to the first synchronization signal and the second synchronization signal, and detecting a second signal for the second base station by eliminating the first signal from the received signals.

According to various embodiments, the method further comprises performing Inverse Fast Fourier transform (IFFT) for the first signal.

According to various embodiments, the first base station comprises a base station corresponding to a signal having the greatest strength among the signals of the adjacent base stations.

According to various embodiments, the first synchronization signal comprises a primary synchronization signal (PSS), and the second synchronization signal comprises a secondary synchronization signal (SSS).

According to various embodiments, a first symbol boundary corresponding to the first signal for the first base station and a second symbol boundary corresponding to the second signal for the second base station are different.

According to various embodiments, if a strength of the second signal for the second base station does not exceed a designated threshold value, eliminating from the received signals a synchronization signal for at least one base station different from the first base station and the second base station among the adjacent base stations. If the strength of the second signal for the second base station exceeds the designated threshold value, stopping an operation of detecting a synchronization signal.

According to various embodiments, the first synchronization signal comprises information for a number of a cell identifier within one cell group. The second synchronization signal comprises information for a number of a cell group identifier.

According to various embodiments, the eliminating of the first signal among the received signals is performed in a time domain.

According to various embodiments, the second base station comprises a base station corresponding to a signal having the second-greatest strength after the first signal among the signals received from the adjacent base stations.

According to various embodiments, the method further comprises determining a duplexing mode using a position of the first synchronization signal and a position of the second synchronization signal within a frame. The duplexing mode is a frequency division duplex (FDD) or a time division duplex (TDD).

According to various embodiments, the first synchronization signal may be generated by Zadoff-Chu sequence, and the second synchronization signal may be generated by Pseudo random Noise (PN) sequence.

According to various embodiments, the method comprises, in order to detect the first synchronization signal, determining a correlation between the received signals and the first synchronization signal, and detecting the first synchronization signal if the correlation exceeds a threshold value.

According to an embodiment of the present disclosure, a synchronization signal of FDD and TDD LTE may be used to find a symbol and frame boundary. Also, the synchronization signal may be used to detect a cell identification that is used when decoding a data channel such as a physical broadcast channel (PBCH), etc.

In case of FDD and TDD, positions of a PSS and an SSS are different from each other and thus, in a case where a duplexing mode is not known, the electronic device 200 may know the duplexing mode using the positions of the PSS and the SSS.

Figure 4:
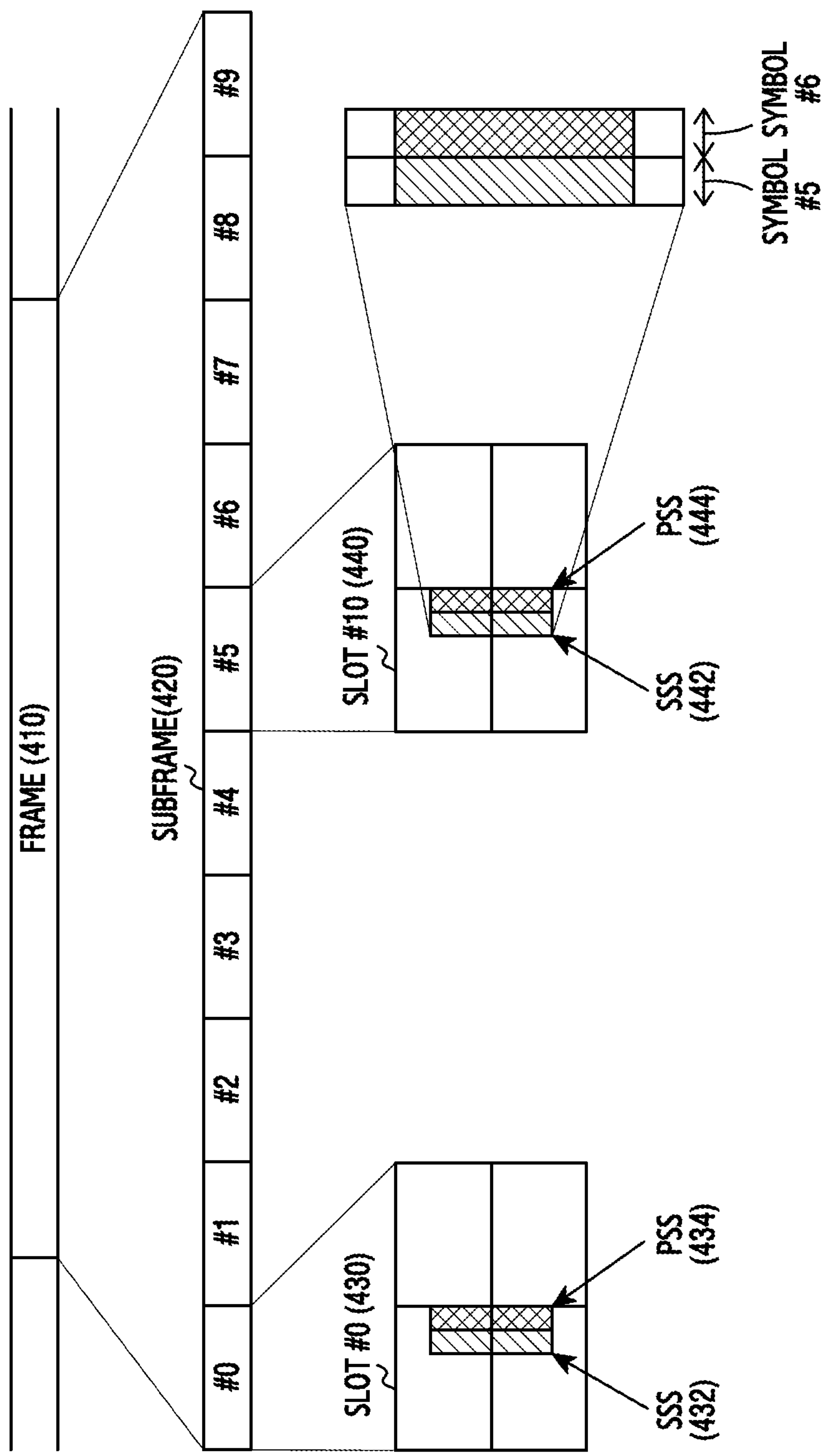
FIG. 4 is a diagram illustrating one example of a synchronization signal received in a synchronization signal detection apparatus according to an embodiment of the present disclosure.

FIG. 4 is a diagram illustrating one example of a synchronization signal received in a synchronization signal detection apparatus according to an embodiment of the present disclosure.

Referring to FIG. 4, an FDD LTE frame structure includes a frame (e.g., time period) 410 of ten milliseconds (ms), and the frame 410 includes ten subframes 420 each having a time period of 1 ms. A number 0 slot 430 of a number 0 subframe of the subframe 420 may include an SSS 432 and a PSS 434. Also, a number 10 slot 440 of a number 5 subframe of the subframe 420 may include an SSS 442 and a PSS 444. The subframe transmitting the synchronization signal (for example, the PSS and/or the SSS) may be called a synchronization signal subframe or a PSS/SSS subframe. The SSS is transmitted at the last-second orthogonal frequency division multiplexing (OFDM) symbol, just before the PSS within the same subframe. That is, the PSSs are transmitted at the last symbols of the number 0 slot 430 and number 10 slot 440 of the subframe 420, and the SSSs are transmitted at the last-second symbols of the same slots. According to an embodiment of the present disclosure, the electronic device 200 may detect a PSS and an SSS of a base station of the greatest signal strength among signals received from adjacent base stations and, through this, acquire an identification of a corresponding cell and thereafter, the electronic device 200 may eliminate a signal of the corresponding cell and search a signal of an adjacent cell.

Figure 5:
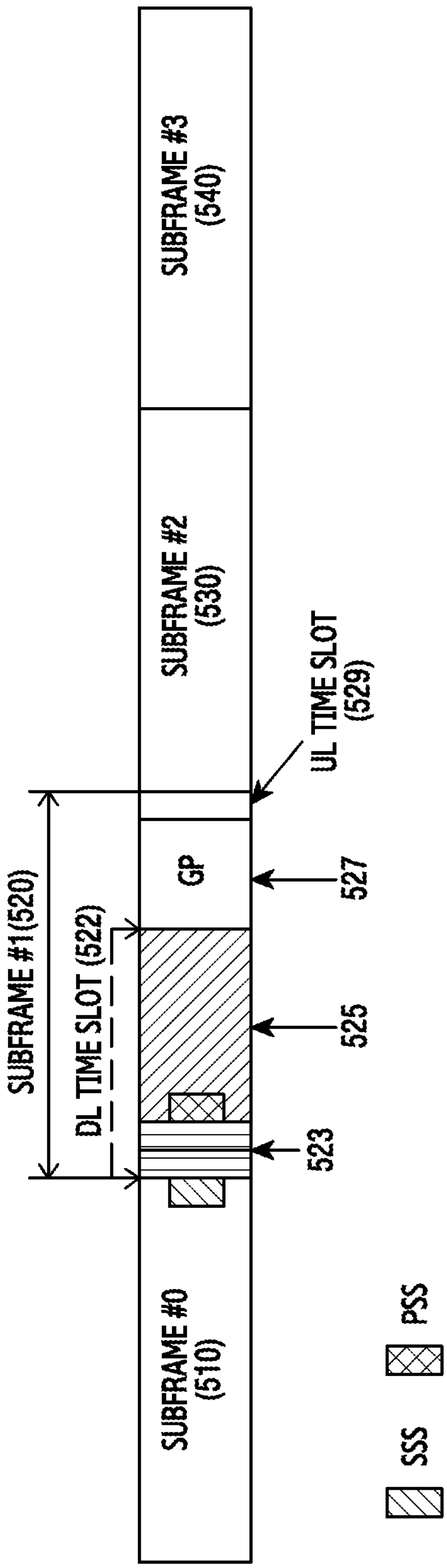
FIG. 5 is a diagram illustrating an example of a synchronization signal received in a synchronization signal detection apparatus according to an embodiment of the present disclosure.

FIG. 5 is a diagram illustrating another example of a synchronization signal received in a synchronization signal detection apparatus according to an embodiment of the present disclosure.

Referring to FIG. 5, a TDD LTE PSS/SSS structure may include a number 0 subframe 510, a number 1 subframe 520, a number 2 subframe 530, and a number 3 subframe 540. The number 0 subframe 510 represents a downlink (DL) subframe, and the number 2 subframe 530 represents an uplink (UL) subframe. The number 1 subframe 520 may include a downlink pilot time slot (DwPTS) 522, a guard period (GP) 527, and an uplink pilot time slot (UpPTS) 529. The DwPTS 522 is used for initial cell search, synchronization or channel estimation in the electronic device 200. The DwPTS 522 may include a reference signal (RS) 523 and data 525.

The GP 527 is a period of canceling interference that is generated in uplink due to a multiple path delay of a downlink signal between uplink and downlink. In the TDD LTE PSS/SSS structure, PSSs are transmitted at third symbols (within the DwPTS) of the number 1 subframe and a number 6 subframe, and SSSs are transmitted at the last symbols (earlier three symbols than the PSSs) of the number 0 subframe and a number 5 subframe. An example of the number 1 subframe is the number 1 subframe 520, and an example of the number 0 subframe is the number 0 subframe 510. According to an embodiment of the present disclosure, the electronic device 200 may detect a PSS and an SSS of a base station of the greatest signal strength among signals received from adjacent base stations and, through this, acquire an identification of a corresponding cell. Thereafter, the electronic device 200 may eliminate a signal of the corresponding cell and search a signal of an adjacent cell.

Figure 6:
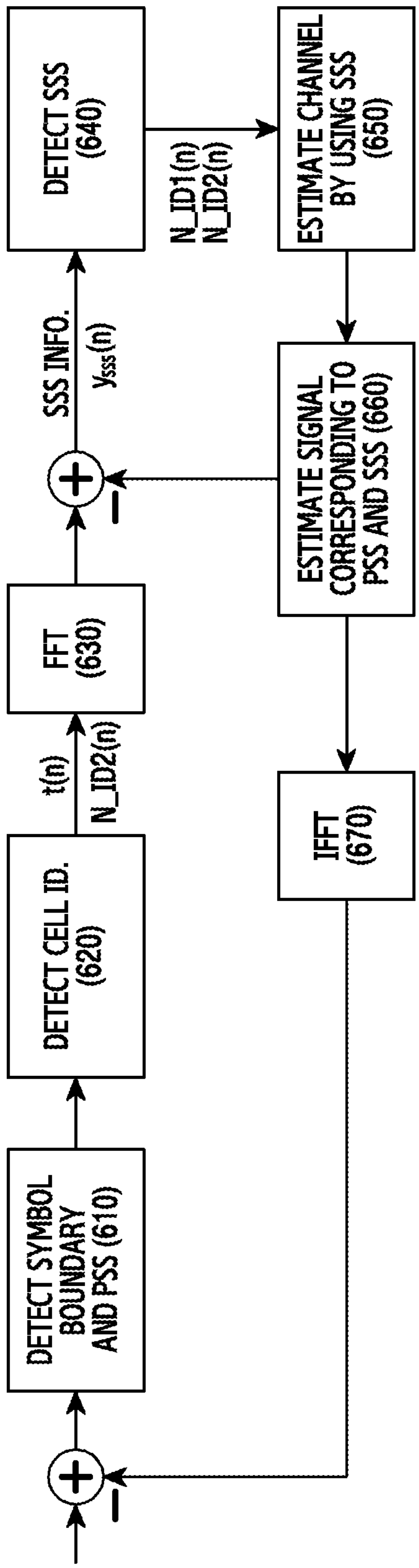
FIG. 6 is a block diagram of a synchronization signal detection apparatus according to an embodiment of the present disclosure.

FIG. 6 is a block diagram of a synchronization signal detection apparatus according to an embodiment of the present disclosure.

Referring to FIG. 6, the synchronization signal detection apparatus may be the electronic device 200 of FIG. 1. In block 610, the electronic device 200 detects a symbol boundary and a PSS of a base station signal of the greatest signal strength among signals received from at least one or more base stations.

In block 620, the electronic device 200 detects an identification within a cell group of a cell of which the signal has the greatest signal strength in order to control the signal of the cell.

An LTE technology defines 504 cell identifications different from one another. Each of the cell identifications corresponds to a reference signal sequence of downlink. The cell identification includes 168 cell identification groups, each group including three identifications. Accordingly, the cell identification may be expressed as in Equation 3 below.

$$CID_{(n)}=3N_{ID1}+N_{ID2} \quad (3)$$

Equation 3

In Equation 3, the CID denotes a cell identification, the $N_{ID1}$ denotes an identification of one group, and the $N_{ID2}$ denotes an identification within the group that is identified by the $N_{ID1}$.

To detect the cell identification, the electronic device 200 may identify an identification ($N_{ID2}$) (for example, 0, 1, 2) within a cell group, from a PSS sequence received from a base station. A PSS of one cell may have three different values in accordance with a cell identification. Three cell identifications within one cell identification group correspond to PSSs different from one another, respectively.

Based on the detected PSS, the electronic device 200 may be aware of a 5 ms timing of the cell. The electronic device 200 may be aware of a position of an SSS that is earlier by a fixed offset than the PSS. According to an embodiment of the present disclosure, the electronic device 200 may control a cell signal of the greatest signal strength so as to reduce the influence of a cell identification of the greatest signal strength.

After identifying the identification within the cell group, in block 630, the electronic device 200 performs FFT for a signal. The signal that is a time-domain signal is FFT transformed into a frequency-domain signal.

The electronic device 200 acquires information about the SSS using the frequency-domain signal into which the time-domain signal is transformed. And, in block 640, the electronic device 200 detects the SSS.

Because the PSS is transmitted every 5 ms, the electronic device 200 may know that a subframe used for detection is one of a zero$^{th}$ subframe and a fifth subframe, by detecting the PSS. However, the electronic device 200 may not exactly know if the corresponding subframe is the zero$^{th}$ subframe or the fifth subframe. The electronic device 200 may not recognize a frame boundary by the PSS only. Accordingly, by detecting an SSS, the electronic device 200 may detect the frame boundary. By detecting the SSS, the electronic device 200 may be aware of the frame boundary. Also, by detecting the SSS, the electronic device 200 may be aware of the cell group ($N_{ID1}$). Accordingly, by acquiring information of the identification ($N_{ID2}$) within the cell group and the identification group ($N_{ID1}$), the electronic device 200 may know a cell identification of a corresponding cell.

In block 650, by using information of the detected SSS, the electronic device 200 may estimate a channel of the SSS.

In block 660, by using the channel estimated in block 650 and the detected cell identification, the electronic device 200 estimates a signal corresponding to the PSS and the SSS.

The estimated signal may be the first signal of FIG. 2. The electronic device 200 may eliminate the first signal from the signal that is FFT-transformed in block 630. The electronic device 200 may be configured to eliminate a noise within the frequency domain by eliminating the first signal. Accordingly, the electronic device 200 may eliminate an interference of an SSS sequence of the greatest signal strength, and the electronic device 200 may detect another SSS sequence that is within the same symbol boundary as the SSS sequence of the greatest signal strength.

Through the signal estimated in block 660, the electronic device 200 may eliminate an interference of an SSS sequence of a greatest signal strength within the same symbol boundary in a frequency domain. According to an embodiment of the present disclosure, the electronic device 200 may not merely eliminate the interference of the SSS sequence of the greatest signal strength within the same symbol boundary but also eliminate a mutual interference between cells having different symbol boundaries.

In block 670, the electronic device 200 performs IFFT for a signal. By performing the IFFT for the signal estimated in block 660, the electronic device 200 may transform the signal that is a frequency-domain signal into a time-domain signal.

The electronic device 200 may use the transformed time-domain signal, for new symbol boundary and PSS detection. The signal is a signal eliminating the PSS and the SSS of the cell of the greatest signal strength among cells adjacent to the electronic device 200. In FIG. 1 of the present disclosure for example, it is assumed that the number 1 cell 120 has the greatest signal strength, and the number 0 cell 110 has a middle signal strength, and the number 2 cell 130 has the least signal strength. In this case, it may be detected that the number 1 cell 120 has the greatest signal strength among signals detected before the eliminating of the PSS and the SSS sequences but, it may be detected that the number 0 cell has the greatest signal strength among signals detected after the synthesizing of the signals, because the signal of the number 1 cell 120 has been eliminated.

When the electronic device 200 again estimates symbol synchronization, the electronic device 200 may not re-estimate symbol synchronization in a time domain, for a synchronization signal ranging within a cyclic prefix (CP). The electronic device 200 may correct a timing offset in a frequency domain and estimate a cell identification corresponding to a new symbol boundary and PSS.

Figure 7A:
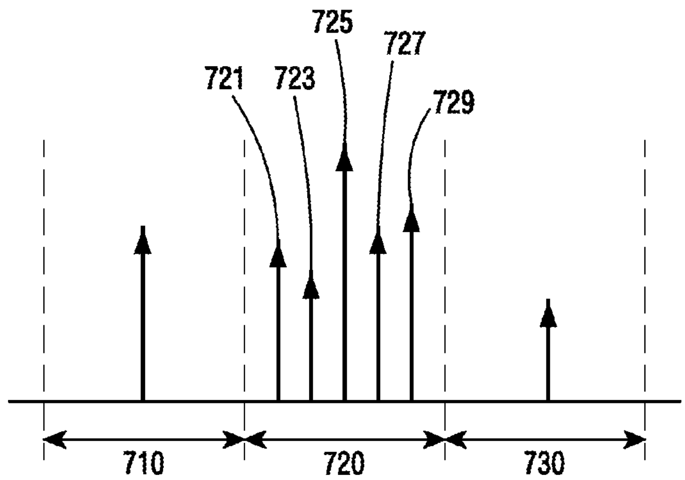
FIGS. 7A to 7C illustrate an example of a synchronization signal detection process according to an embodiment of the present disclosure.
Figure 7B:
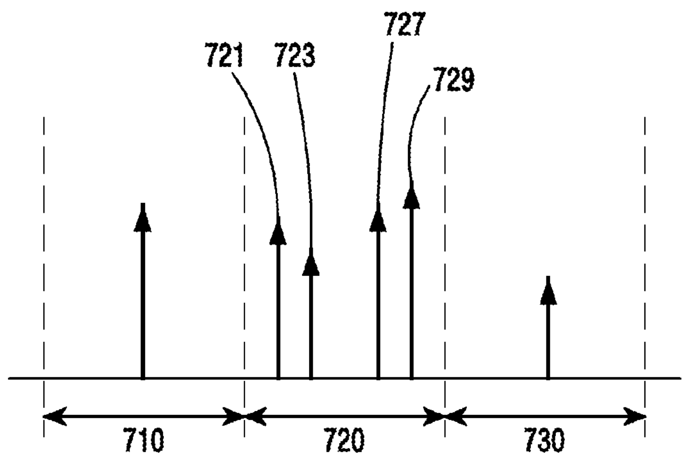
Figure 7C:
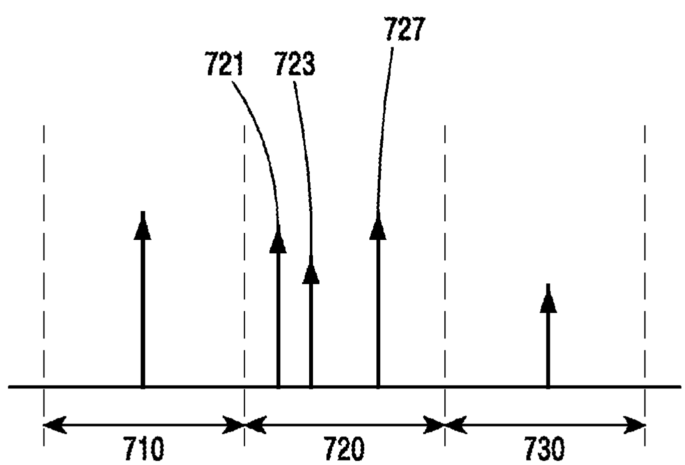

FIGS. 7A to 7C illustrate an example of a synchronization signal detection process having the same symbol boundary according to an embodiment of the present disclosure.

Referring to FIGS. 7A to 7C, horizontal axes of FIGS. 7A to 7C indicate time, and vertical axes indicate signal strengths. In FIGS. 7A to 7C, each arrow may indicate a signal at each different symbol boundary in each time domain 710, 720, 730. Accordingly, the signal may be a symbol at each different symbol boundary in the domain 710, the domain 720, and the domain 730.

Referring to FIG. 7A, assuming that a plurality of signals 721, 723, 725, 727, and 729 exist in the domain 720, there may be difficulties in detecting the signals 721, 723, 727, and 729 around the signal 725 due to the influence of the signal 725. The signal 725 may interrupt, due to its great signal strength, electronic device's synchronization acquisition and cell identification detection for the signals 721, 723, 727, and 729 of relatively weak strengths around the signal 725. According to an embodiment of the present disclosure, the electronic device 200 detects a PSS and an SSS of the signal 725 and estimates a channel through a sequence of the SSS and thereafter, estimates a signal corresponding to the PSS and the SSS using a detected cell identification and an estimated channel Thereafter, in a PSS detection process, the electronic device 200 eliminates the estimated signal from an adjacent cell search signal and detects a signal eliminating the signal 725. FIG. 7B illustrates an adjacent cell search signal result that is detected through the eliminating of the signal 725.

FIG. 7C illustrates an adjacent cell search signal result that is detected through the eliminating of the signal 725 and the signal 729. The electronic device 200 may eliminate the sequence of the signal 725 of the greatest signal strength and thereafter, sequentially eliminate a sequence of a signal of the second-greatest signal strength within the same symbol boundary. According to an embodiment of the present disclosure, referring to FIG. 7A, it may be appreciated that a signal strength is greatest in order of 725, 729, 727, 721, and 723. Accordingly, the electronic device 200 may decrease the influence caused by interference between adjacent cells by eliminating sequences of signals in order of 725, 729, 727, 721, and 723.

Figure 8A:
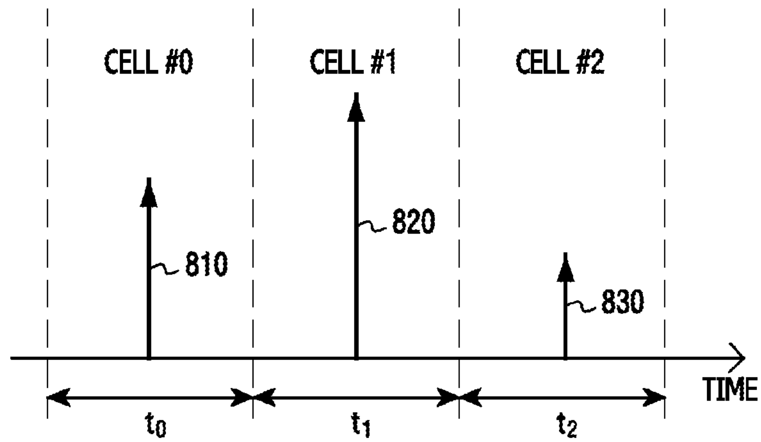
FIGS. 8A to 8C illustrate an example of a synchronization signal detection process according to an embodiment of the present disclosure.
Figure 8B:
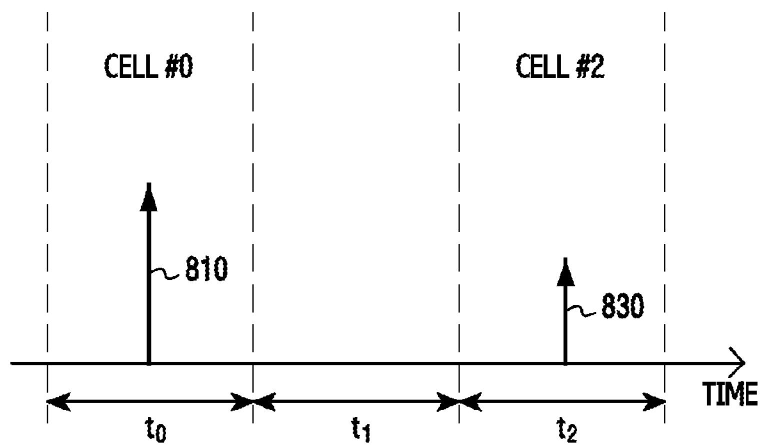
Figure 8C:
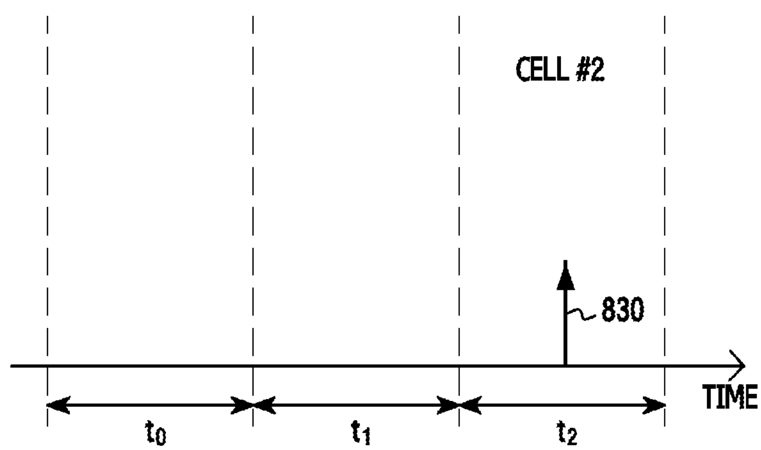

FIGS. 8A to 8C illustrate an example of a synchronization signal detection process according to an embodiment of the present disclosure.

Referring to FIGS. 8A to 8C, horizontal axes of FIGS. 8A to 8C indicate time, and vertical axes indicate signal strengths. In FIGS. 8A to 8C, each arrow may indicate a signal at each different symbol boundary in each time domain 810, 820, 830. Accordingly, the signal may be a symbol at each different symbol boundary in the domain 810, the domain 820, and the domain 830.

By using a signal corresponding to a PSS and an SSS estimated through blocks 610 to 660 of FIG. 6, the electronic device 200 may eliminate the PSS and the SSS corresponding to a detected cell identification. By performing IFFT in block 670 of FIG. 6, the electronic device 200 may transform the signal corresponding to the estimated PSS and SSS into a time-domain signal. Thereafter, the electronic device 200 may synthesize a cell search signal and the transformed signal (time-domain) and detect a cell signal of a different symbol boundary through a signal eliminating a cell signal corresponding to the cell identification.

FIG. 8B illustrates signals detected after the eliminating of a signal 820 of a cell of the greatest signal strength among signals of different symbol boundaries.

FIG. 8C illustrates a signal detected after the eliminating of the signal 820 of the cell of the greatest signal strength and a signal 810 of the second-greatest signal strength among the signals of the different symbol boundaries.

According to an embodiment of the present disclosure, the cell signal elimination procedure may be carried out for cells having signals of strengths exceeding a threshold value among detected signals. The cell signal elimination procedure may be no longer carried out in a case where there is no cell exceeding the threshold value after eliminating of the cell signal.

Figure 9:
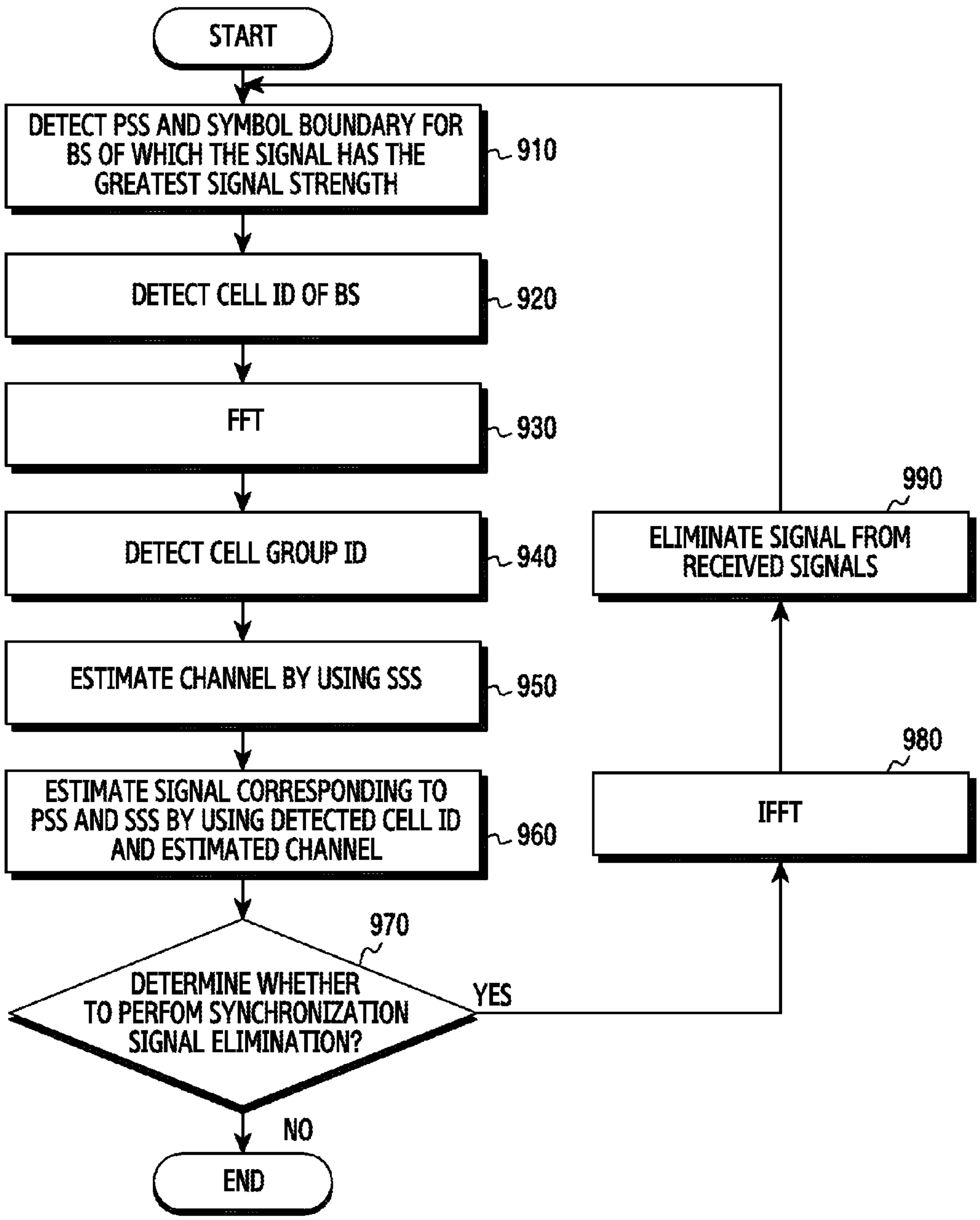
FIG. 9 is a flowchart illustrating a synchronization signal detection process according to an embodiment of the present disclosure.

FIG. 9 is a flowchart illustrating a synchronization signal detection process according to an embodiment of the present disclosure.

Referring to FIG. 9, in operation 910, the electronic device 200 detects a PSS and symbol boundary for a base station of which the signal has the greatest signal strength among signals received from adjacent base stations.

In operation 920, the electronic device 200 detects a cell identification ($N_{ID2}$) within a group from the detected PSS of the base station.

In operation 930, the electronic device 200 performs FFT for the signal. According as the FFT is performed, the time-domain signal is transformed into a frequency-domain signal.

In operation 940, the electronic device 200 acquires information about an SSS of the base station of which has the greatest signal strength and thereafter, detects a cell group identification using the information about the SSS.

In operation 950, the electronic device 200 performs channel estimation using the detected SSS. The electronic device 200 may check the cell group identification and the identification within the cell group and detect a cell identification and thereafter, estimate a channel through the detected cell identification.

In operation 960, the electronic device 200 uses the estimated channel and the detected cell identification, to estimate a signal corresponding to the PSS and the SSS. The signal corresponding to the PSS and the SSS may be the first signal of FIG. 2.

In operation 970, the electronic device 200 determines whether to perform synchronization signal elimination for another cell. The electronic device 200 may perform synchronization signal elimination for a signal synthesizing signals received from adjacent base stations, in order of strengths of the received signals. The electronic device 200 may compare the strengths of the signals received from the adjacent base stations with a set threshold value, and repeatedly perform the synchronization signal elimination until the strengths of the received signals do not exceed the set threshold value. For example, the electronic device 200 may determine whether a strength of the first signal exceeds the threshold value.

In operation 980, the electronic device 200 performs IFFT for the estimated signal corresponding to the PSS and the SSS. By performing the IFFT, the electronic device 200 transforms a frequency-domain signal into a time-domain signal.

In operation 990, the electronic device 200 eliminates a signal into which the first signal is IFFT transformed, among signals received from adjacent cells. A signal eliminating the IFFT'd estimated signal corresponding to the PSS and the SSS among the signals received from the adjacent cells may be a signal eliminating a signal corresponding to an identification of the greatest signal strength among the received signals.

Figure 10:
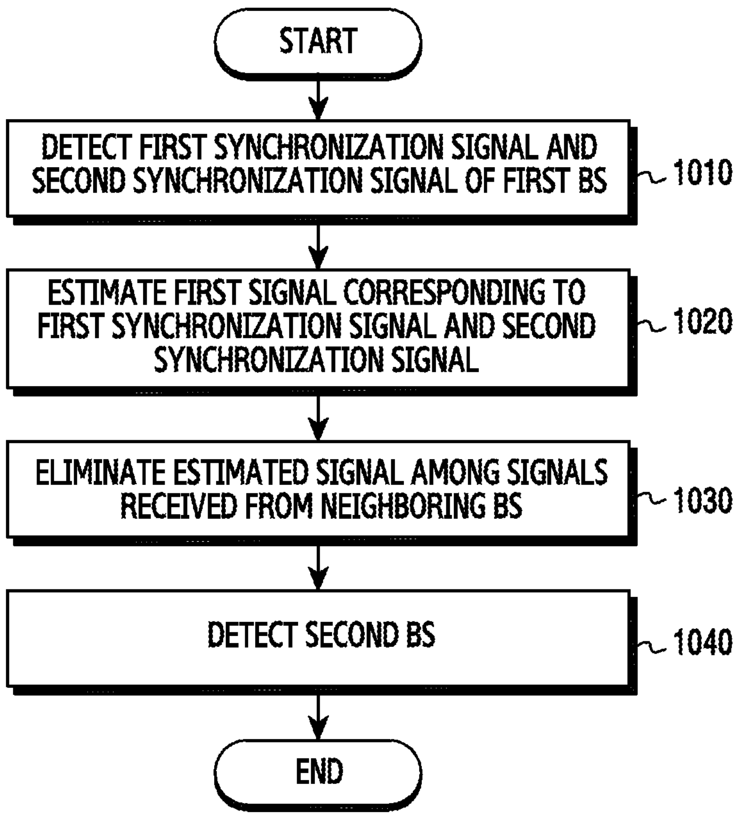
FIG. 10 is a flowchart illustrating a synchronization signal detection process for canceling inter-cell interference according to an embodiment of the present disclosure.

FIG. 10 is a flowchart illustrating a synchronization signal detection process for canceling inter-cell interference according to an embodiment of the present disclosure.

Referring to FIG. 10, in operation 1010, the electronic device 200 may detect a first synchronization signal and a second synchronization signal of a first base station. The electronic device 200 may receive signals from adjacent base stations, respectively, and synthesize the received signals. The electronic device 200 may detect a base station signal of the greatest signal strength from the synthesized signal. The electronic device 200 may detect a first synchronization signal and second synchronization signal from the base station signal of the greatest signal strength. The first synchronization signal may be a PSS. The second synchronization signal may be an SSS.

In operation 1020, the electronic device 200 may estimate a first signal corresponding to the first synchronization signal and the second synchronization signal. The electronic device 200 may detect a cell identification from the detected first synchronization signal and second synchronization signal, and estimate a channel By using the estimated channel and the detected cell identification, the electronic device 200 may estimate the first signal corresponding to the first synchronization signal and the second synchronization signal. The first signal may be the first signal of FIG. 2.

In operation 1030, the electronic device 200 eliminates a signal corresponding to the first signal, among the signals received from the adjacent base stations. The electronic device 200 performs IFFT for the first signal estimated in operation 1020. By the IFFT execution, the signal that is a frequency domain signal is transformed into a time domain signal. The electronic device 200 eliminates the signal into which the first signal is IFFT transformed, among the received signals.

It is characterized that a signal eliminating the IFFT'd signal is a signal eliminating a base station signal including a cell identification eliminating the PSS and the SSS.

In operation 1040, by eliminating the signal corresponding to the first signal, the electronic device 200 may detect a synchronization signal of a second base station. By using the base station signal eliminating the PSS and the SSS, the electronic device 200 may exclude the first base station corresponding to the PSS and the SSS from the adjacent base stations. The electronic device 200 may detect a base station of the greatest signal strength among the adjacent base stations excepting the first base station.

According to various embodiments of the present disclosure, unlike a successive interference cancellation (SIC) scheme in a frequency domain, the electronic device 200 may apply successive interference cancellation in a time domain, in a process of detecting a cell identification. By applying the successive interference cancellation in the time domain, the electronic device 200 may find a new symbol boundary. By applying the successive interference cancellation in the time domain and re-searching symbol synchronization, the electronic device 200 may efficiently eliminate the influence of a base station having the greatest signal strength in a process of detecting the symbol synchronization.

Methods according to various embodiments mentioned in claims of the present disclosure and/or a specification may be implemented in a form of hardware, software, or a combination of hardware and software.

In a case of implementing by software, a computer-readable storage medium storing one or more programs (software modules) may be provided. The one or more programs stored in the computer-readable storage medium are configured to be executed by one or more processors within an electronic device. The one or more programs include instructions for enabling the electronic device to execute the methods according to the embodiments mentioned in the claims and/or specification of the present disclosure.

This program (software module, software) may be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or an optical storage device of another form, a magnetic cassette. Or, the program may be stored in a memory constructed in combination of some or all of them. Also, each constructed memory may be included in plural as well.

Further, the program may be stored in an attachable storage device accessible through a communication network such as the Internet, an intranet, a local area network (LAN), a wireless LAN (WLAN) and a storage area network (SAN), or a communication network constructed in combination of them. This storage device may connect to a device performing an embodiment of the present disclosure through an external port. Also, a separate storage device on the communication network may connect to a device performing an embodiment of the present disclosure as well.

In the aforementioned various embodiments of the present disclosure, constituent elements included in the disclosure have been expressed in the singular form or the plural form in accordance to a proposed embodiment. But, the expression of the singular form or plural form is selected suitable to a proposed situation for description convenience, and the present disclosure is not limited to singular or plural constituent elements. Even a constituent element expressed in the plural form may be constructed in the singular form, or even a constituent element expressed in the singular form may be constructed in the plural form.

According to an embodiment of the present disclosure, it may improve frame synchronization and cell identification detection performance in a communication system.

According to an embodiment of the present disclosure, it may improve performance deterioration that may take place in a synchronization process in a communication system.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating an electronic device, the method comprising:

receiving signals from a plurality of base stations (BSs) including a first BS and a second BS;

determining a first symbol boundary for the first BS that is identified based on a strength of each of the received signals among the plurality of BSs;

determining, based on the determined first symbol boundary, a cell identifier of the first BS by detecting a first synchronization signal and a second synchronization signal of the first BS from the received signals;

estimating first signals corresponding to the first synchronization signal and the second synchronization signal of the first BS transmitted through a channel, by performing channel estimation with the determined cell identifier;

transforming the estimated first signals from a frequency domain to a time domain;

removing the transformed first signals from the received signals in the time domain; and detecting a first synchronization signal and a second synchronization signal of the second BS from remaining signals in which the transformed first signals are removed, wherein the detecting of the first synchronization signal and the second synchronization signal of the second BS comprises determining a second symbol boundary for the second BS which is different from the first symbol boundary for the first BS in the time domain.

2. The method of claim 1, wherein the first BS corresponds to a signal having a greatest strength among the signals of the plurality of BSs.

3. The method of claim 1, wherein the first synchronization signal of the first BS comprises a primary synchronization signal (PSS) of the first BS, wherein the first synchronization signal of the second BS comprises a primary synchronization signal (PSS) of the second BS, wherein the second synchronization signal of the first BS comprises a secondary synchronization signal (SSS) of the first BS, and wherein the second synchronization signal of the second BS comprises a secondary synchronization signal (SSS) of the second BS.

4. The method of claim 1, further comprising:

if strengths of second signals corresponding to the first synchronization signal and the second synchronization signal of the second BS exceed a designated threshold, removing the second signals from the received signals; and if the strengths of the second signals for the second BS do not exceed the designated threshold, stopping an operation of detecting a synchronization signal.

5. The method of claim 1, wherein the transforming of the first signals from the frequency domain to the time domain comprises performing an inverse fast fourier transform (IFFT) for the estimated first signals.

6. The method of claim 5, wherein the determining of the cell identifier of the first BS comprises:

detecting an identifier in a cell group based on the first synchronization signal of the first BS;

performing a FFT for the received signals after the detecting the identifier in the cell group; and detecting a cell group identifier indicating the cell group based on the second synchronization signal of the first BS, and wherein the cell identifier is specified by the identifier in the cell group and the cell group identifier.

7. The method of claim 1, wherein the second BS corresponds to a signal having a second-greatest strength after the first signals among the signals received from the plurality of BSs.

8. The method of claim 1, further comprising:

determining a new symbol boundary by applying a successive interference cancellation (SIC) in the time domain.

9. An electronic device comprising:

at least one transceiver configured to receive signals from a plurality of base stations (BSs) including a first BS and a second BS; and at least one processor operably coupled to the at least one transceiver, configured to:

determine a first symbol boundary for the first BS that is identified based on a strength of each of the received signals among the plurality of BSs;

determine, based on the determined first symbol boundary, a cell identifier of the first BS by detecting a first synchronization signal and a second synchronization signal of the first BS from the received signals;

estimate first signals corresponding to the first synchronization signal and the second synchronization signal of the first BS transmitted through a channel, by performing channel estimation with the determined cell identifier;

transform the estimated first signals from a frequency domain to a time domain;

remove the transformed first signals from the received signals in the time domain; and detect a first synchronization signal and a second synchronization signal of the second BS from remaining signals in which the transformed first signals are removed, wherein, to detect the first synchronization signal and the second synchronization signal of the second BS, the at least one processor is further configured to determine a second symbol boundary for the second BS which is different from the first symbol boundary for the first BS in the time domain.

10. The electronic device of claim 9, wherein the first BS corresponds to a signal having a greatest strength among the signals of the plurality of BSs.

11. The method of claim 9, wherein the first synchronization signal of the first BS comprises a primary synchronization signal (PSS) of the first BS, wherein the first synchronization signal of the second BS comprises a primary synchronization signal (PSS) of the second BS, wherein the second synchronization signal of the first BS comprises a secondary synchronization signal (SSS) of the first BS, and wherein the second synchronization signal of the second BS comprises a secondary synchronization signal (SSS) of the second BS.

12. The electronic device of claim 9, wherein the at least one processor is further configured to:

if strengths of second signals corresponding to the first synchronization signal and the second synchronization signal of the second BS exceeds a designated threshold, remove the second signals from the received signals; and if the strengths of the second signals for the second BS does not exceed the designated threshold, stop an operation of detecting a synchronization signal.

13. The electronic device of claim 9, wherein, to transform the first signals from the frequency domain to the time domain, the at least one processor is further configured to perform an inverse fast fourier transform (IFFT) for the estimated first signals.

14. The electronic device of claim 13, wherein, to determine the cell identifier, the at least one processor is further configured to:

detect an identifier in a cell group based on the first synchronization signal of the first BS;

perform a FFT for the received signals after the detection of the identifier in the cell group; and detect a cell group identifier indicating the cell group based on the second synchronization signal of the first BS, and wherein the cell identifier is specified by the identifier in the cell group and the cell group identifier.

15. The electronic device of claim 9, wherein the second BS comprises a BS corresponding to a signal having a second-greatest strength after the first signals among the signals received from the plurality of BSs.

16. The electronic device of claim 9, wherein the at least one processor is further configured to:

determine a new symbol boundary by applying a successive interference cancellation (SIC) in the time domain.

* * * * *